(12) United States Patent
Halfmann et al.

(10) Patent No.: US 10,655,476 B2
(45) Date of Patent: May 19, 2020

(54) GAS TURBINE ENGINES WITH AIRFOILS HAVING IMPROVED DUST TOLERANCE

(71) Applicant: HONEYWELL INTERNATIONAL INC., Morris Plains, NJ (US)

(72) Inventors: Steve Halfmann, Chandler, AZ (US);
Daniel C. Crites, Mesa, AZ (US);
Mark C. Morris, Phoenix, AZ (US);
Ardeshir Riahi, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 98 days.

(21) Appl. No.: 15/841,844

(22) Filed: Dec. 14, 2017

(65) Prior Publication Data
US 2019/0186273 A1    Jun. 20, 2019

(51) Int. Cl.
*F01D 5/18*    (2006.01)

(52) U.S. Cl.
CPC .......... *F01D 5/187* (2013.01); *F05D 2220/32* (2013.01); *F05D 2240/24* (2013.01); *F05D 2250/60* (2013.01); *F05D 2260/20* (2013.01); *F05D 2260/607* (2013.01)

(58) Field of Classification Search
CPC ....................................................... F01D 5/187
USPC ....................................................... 416/97 R
See application file for complete search history.

(56) References Cited

U.S. PATENT DOCUMENTS

| | | | |
|---|---|---|---|
| 4,604,031 A * | 8/1986 | Moss ...................... | F01D 5/187 415/115 |
| 5,403,159 A | 4/1995 | Green et al. | |
| 5,975,850 A | 11/1999 | Abuaf et al. | |
| 6,595,750 B2 * | 7/2003 | Parneix ................... | F01D 5/187 416/97 R |
| 6,672,836 B2 | 1/2004 | Merry | |
| 6,974,308 B2 | 12/2005 | Halfmann et al. | |
| 7,118,325 B2 * | 10/2006 | Kvasnak ................. | F01D 5/005 415/115 |

(Continued)

FOREIGN PATENT DOCUMENTS

EP    0340149 A1    11/1989

OTHER PUBLICATIONS

Crites, D. et al.; Gas Turbine Engines With Improved Airfoil Dust Removal; Filed with the USPTO on Nov. 13, 2017 and assigned U.S. Appl. No. 15/810,809.

*Primary Examiner* — Woody A Lee, Jr.
*Assistant Examiner* — Michael L Sehn
(74) *Attorney, Agent, or Firm* — Lorenz & Kopf, LLP

(57) ABSTRACT

An airfoil for a gas turbine engine includes a first side wall; a second side wall joined to the first side wall at a leading edge and a trailing edge; and an internal cooling system arranged within the first and second side walls configured to direct cooling air through and out of the airfoil. The internal cooling system has a first cooling circuit that includes an acceleration channel generally extending in a radial outward direction. A first section of the acceleration channel decreases in cross-sectional area along the radial outward direction such that the cooling air is accelerated through the first section of the acceleration channel. The first cooling circuit further includes a trailing edge chamber fluidly coupled to receive at least a portion of the cooling air from the acceleration channel and extending generally in a chord-wise aft direction from the acceleration channel to the trailing edge.

19 Claims, 7 Drawing Sheets

(56) References Cited

U.S. PATENT DOCUMENTS

| | | |
|---|---|---|
| 7,610,946 B2 | 11/2009 | Morris et al. |
| 8,596,966 B1 | 12/2013 | Liang |
| 8,702,391 B2 * | 4/2014 | Bregman ............... F01D 5/187 416/96 R |
| 9,057,276 B2 | 6/2015 | Lee |
| 9,121,291 B2 | 9/2015 | Hada |
| 9,631,499 B2 | 4/2017 | Liang |
| 2007/0201980 A1 | 8/2007 | Morris et al. |
| 2013/0280080 A1 | 10/2013 | Levine et al. |
| 2013/0343872 A1 * | 12/2013 | Tibbott ................ F01D 5/186 415/115 |
| 2014/0083116 A1 * | 3/2014 | Crites .................. F01D 5/187 60/806 |
| 2016/0341046 A1 | 11/2016 | Feldmann et al. |
| 2017/0107828 A1 | 4/2017 | Krumanaker et al. |
| 2017/0130598 A1 | 5/2017 | Liang et al. |
| 2017/0211396 A1 * | 7/2017 | Mongillo ............... F01D 5/187 |

\* cited by examiner

GAS TURBINE ENGINES WITH AIRFOILS HAVING IMPROVED DUST TOLERANCE

TECHNICAL FIELD

The present invention generally relates to gas turbine engines, and more particularly relates to gas turbine engines having airfoils with improved dust tolerance and dust removal.

BACKGROUND

Gas turbine engines are generally used in a wide range of applications, such as aircraft engines and auxiliary power units. In a gas turbine engine, air is compressed in a compressor, and mixed with fuel and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path in order to prevent overheating and potential mechanical issues attributable thereto. As such, it is desirable to cool the airfoils of the rotor blades and stator vanes to prevent or reduce adverse impact and extend useful life. Mechanisms for cooling turbine airfoils include ducting cooling air through internal passages and then venting the cooling air through holes formed in the airfoil. Internal and film cooling techniques attempt to maintain temperatures that are suitable for material and stress level. However, given the high temperature of engine operation, cooling remains a challenge. This is particularly relevant in dusty or dirty environments in which dust may become lodged within the airfoil to block and/or impact cooling efforts.

Accordingly, it is desirable to provide gas turbine engines with improved temperature management, including mitigating or preventing adverse issues associated with dust particles. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an airfoil for a gas turbine engine includes a first side wall; a second side wall joined to the first side wall at a leading edge and a trailing edge and extending with the first side wall in a radial outward direction from a base coupled to an airfoil platform; and an internal cooling system arranged within the first and second side walls configured to direct cooling air through and out of the airfoil. The internal cooling system has a first cooling circuit that includes an acceleration channel generally extending in a radial outward direction and receiving cooling air from a first source. At least a first section of the acceleration channel decreases in cross-sectional area along the radial outward direction such that the cooling air is accelerated through the first section of the acceleration channel. The first cooling circuit further includes a trailing edge chamber fluidly coupled to receive at least a portion of the cooling air from the acceleration channel and extending generally in a chordwise aft direction from the acceleration channel to the trailing edge.

In accordance with another exemplary embodiment, an airfoil for a gas turbine engine includes a first side wall; a second side wall joined to the first side wall at a leading edge and a trailing edge and extending with the first side wall in a radial outward direction from a base coupled to an airfoil platform; a tip cap extending between the first and second side walls such that the tip cap and at least portions of the first and second side walls form a blade tip; and an internal cooling system arranged within the first and second side walls configured to direct cooling air through and out of the airfoil. The internal cooling system includes a first cooling circuit with at least a leading edge cooling passage extending from a first source in the radial outward direction, and a tip cap passage fluidly coupled to the leading edge cooling passage and extending in a chordwise aft direction between the leading edge cooling passage and the trailing edge. The tip cap passage is at least partially formed by tip cap and a chordwise wall. The internal cooling system includes a second cooling circuit with at least a serpentine passage that includes a first leg extending from a second source in the radial outward direction, a second leg extending in a radial inward direction, and a first transition fluidly coupling the first leg to the second leg. The first transition is at least partially formed by the chordwise wall, and the chordwise wall includes at least a first crossover hole at the first transition that fluidly couples the serpentine passage to the tip cap passage. The second cooling circuit further includes an acceleration channel fluidly coupled to the serpentine passage and generally extending in the radial outward direction, and a trailing edge chamber fluidly coupled to the acceleration channel and extending generally in the chordwise aft direction from the acceleration channel to the trailing edge.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engines with turbine components having improved cooling characteristics and temperature management. In particular, exemplary embodiments include turbine airfoils with internal features that facilitate dust removal. Such dust removal prevents accumulation within the cooling circuits, thereby providing more efficient and/or improved cooling characteristics.

Figure 1:
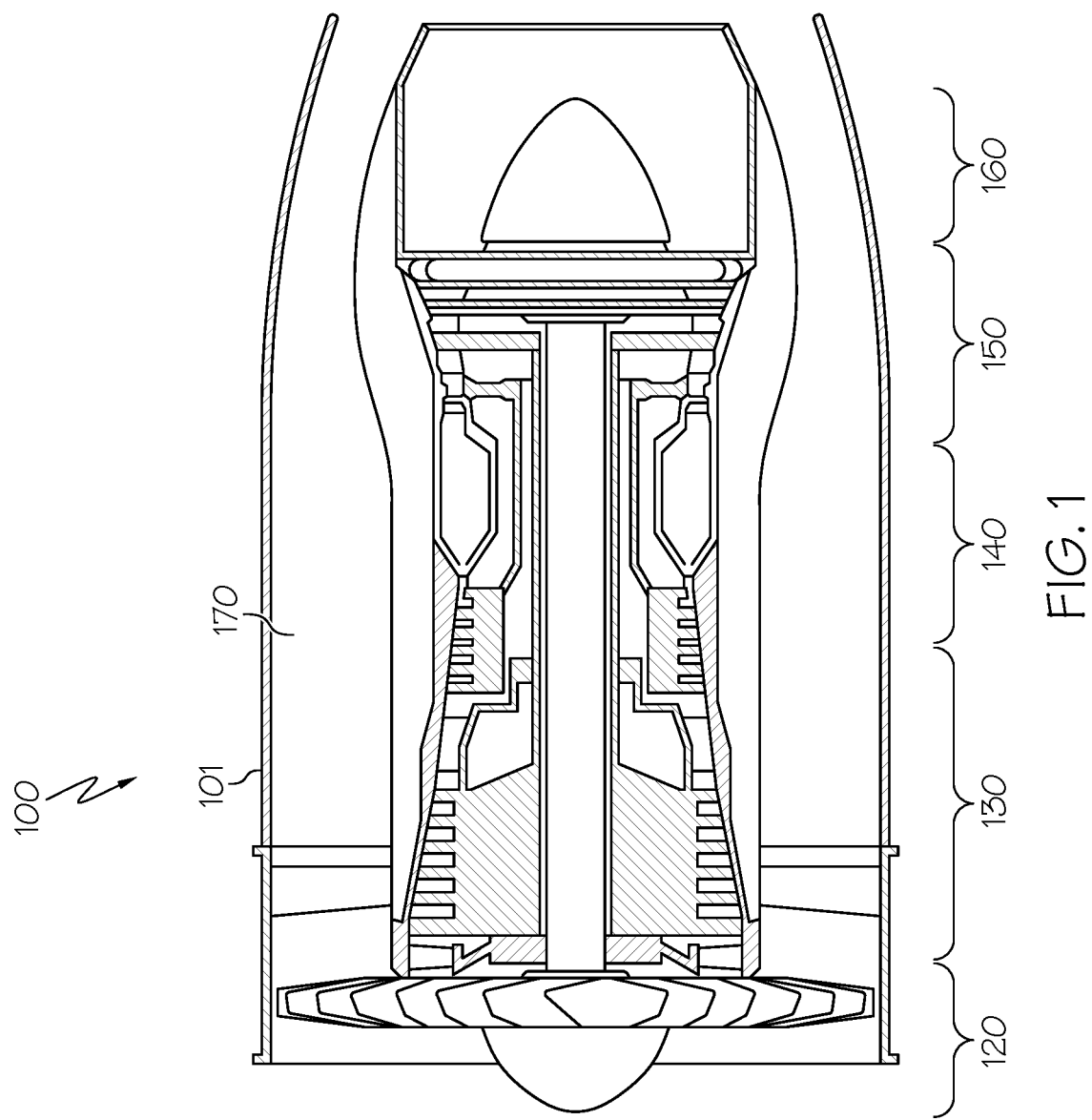
FIG. 1 is a partial cross-sectional view of a gas turbine engine in accordance with an exemplary embodiment.

FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit or a propulsion system for an aircraft or other type of vehicle. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. As described in further detail below, the turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
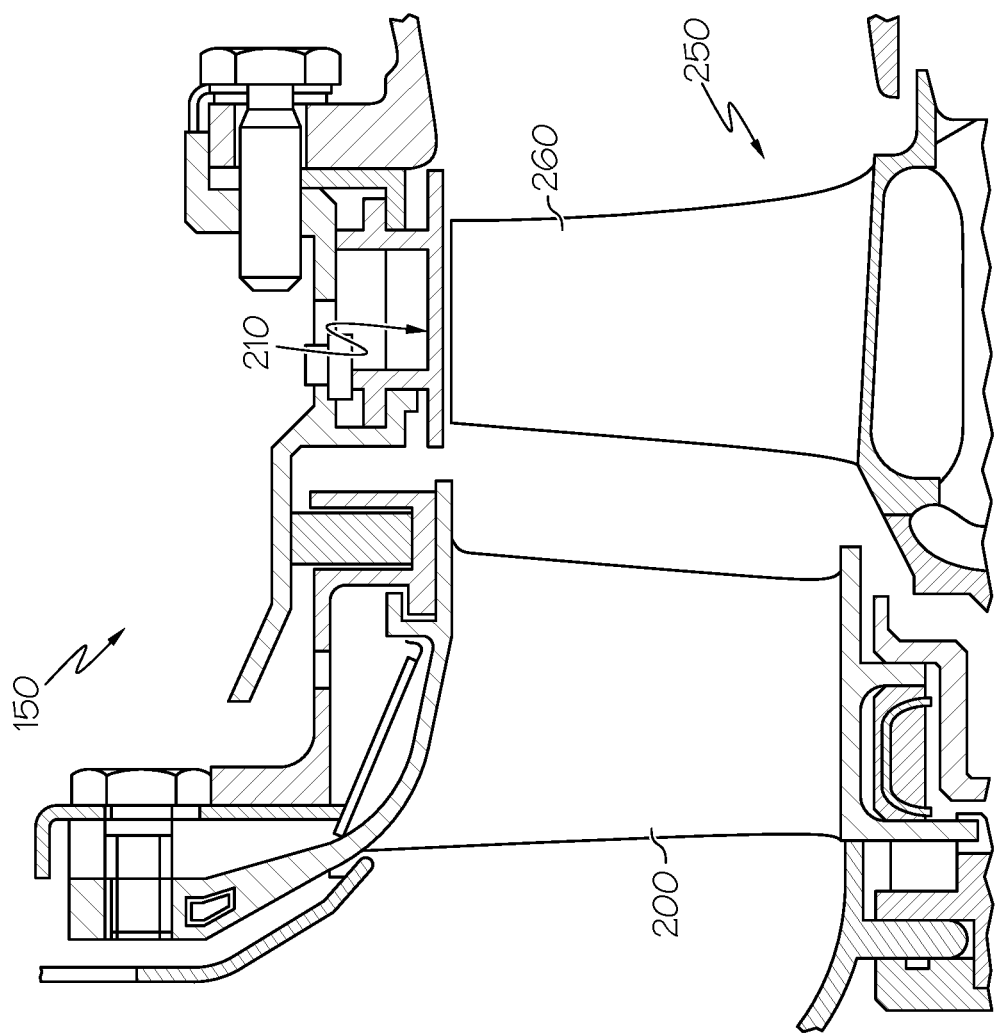
FIG. 2 is a partial, sectional elevation view illustrating a portion of a turbine section of the gas turbine engine of FIG. 1 in accordance with an exemplary embodiment.

FIG. 2 is a partial cross-sectional side view of a turbine section of an engine, such as the turbine section 150 of engine 100 of FIG. 1 in accordance with an exemplary embodiment. The turbine section 150 includes a turbine stator 200 and a turbine rotor 250 surrounded by a shroud 210 defining a gas flow path through which hot, combusted air from an upstream combustion section (e.g. combustion section 140 of FIG. 1) is directed. Although only one turbine stator 200 and one turbine rotor 250 are shown, such stators 200 and rotors 250 are typically arranged in alternating axially spaced, circumferential rows. As used herein, the term "axial" refers to a direction generally parallel to the engine centerline, while the term "radial" refers to a direction generally perpendicular to the engine centerline.

The rotor 250 generally includes rotor blades 260 (one of which is shown) mounted on a rotor disc (not shown), which in turn is coupled to an engine shaft (not shown). The turbine stator 200 directs the air toward the turbine rotor 250. The air impinges upon rotor blades 260 of the turbine rotor 250, thereby driving the turbine rotor 250 for power extraction. To allow the turbine section 150 to operate at desirable elevated temperatures, certain components are cooled, including the rotor 250 and the stator 200, as described in greater detail below.

Figure 3:
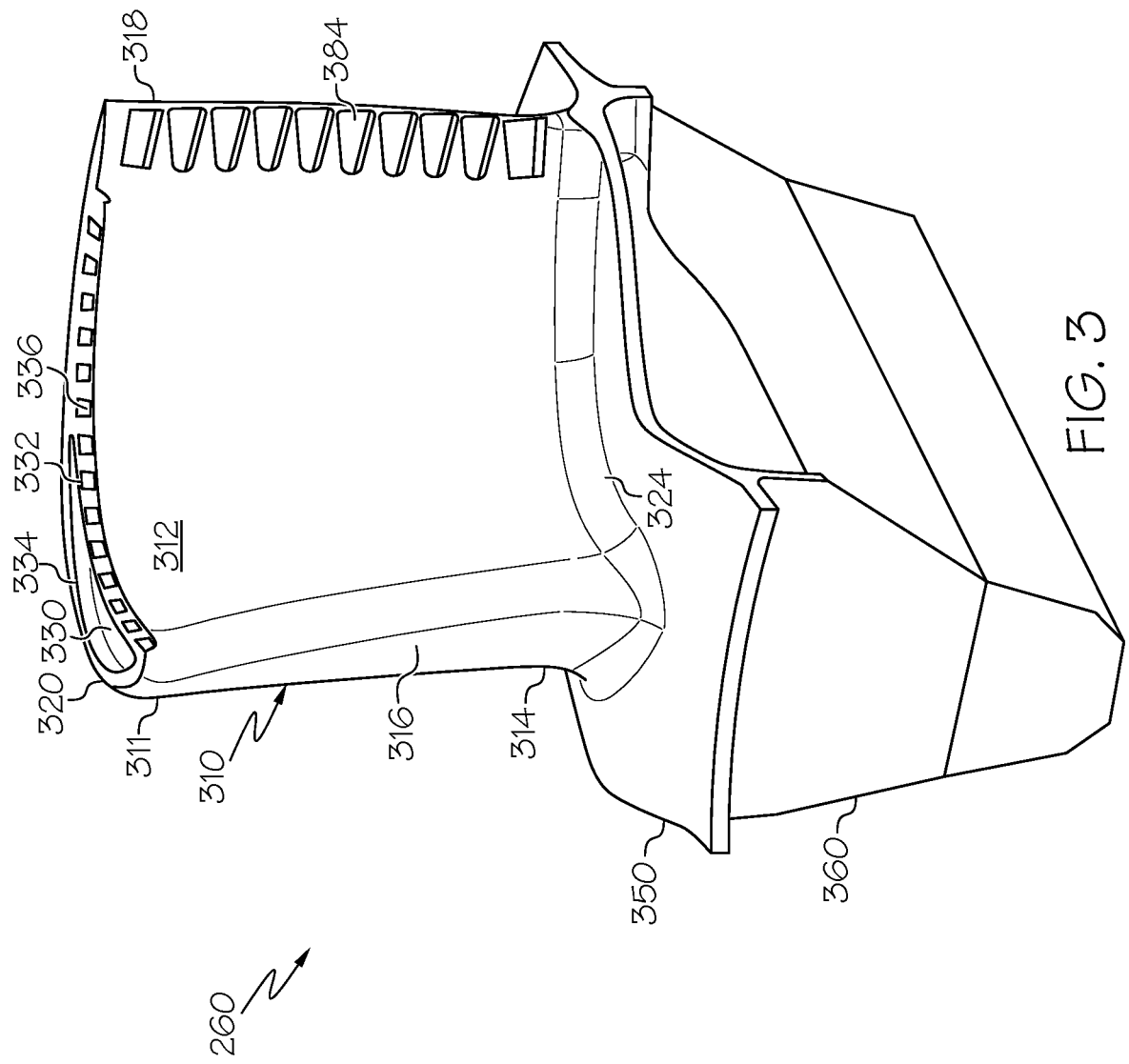
FIG. 3 is an isometric view of a turbine rotor blade of the turbine section of FIG. 2 in accordance with an exemplary embodiment.

FIG. 3 illustrates an exemplary aircraft jet engine turbine rotor blade, such as rotor blade 260 of FIG. 2, removed from a turbine section. FIG. 3 depicts one exemplary embodiment, and other exemplary embodiments may have alternate configurations or arrangements.

The rotor blade 260 includes an airfoil 310, a platform 350 and a root 360. The platform 350 is configured to radially contain turbine airflow within a shroud (e.g., shroud 210 of FIG. 2). The root 360 extends from the underside of the platform 350 and is configured to couple the blade 260 to a turbine rotor disc (not shown). In general, the rotor blade 260 may be made from any suitable material, including high heat and high stress resistant aerospace alloys, such as nickel-based alloys, RENE 88, MAR-M-247, single-crystal materials, steels, titanium alloys or the like.

The airfoil 310 projects radially outward from the platform 350. The airfoil 310 is formed by a body 311 with two side (or outer) walls 312, 314, each having outer surfaces that together define an airfoil shape. The first side wall 312 defines a pressure side with a generally concave shape, and the second side wall 314 defines a suction side with a generally convex shape. In a chordwise orientation, the airfoil side walls 312, 314 are joined at a leading edge 316 and a trailing edge 318. The trailing edge 318 may include trailing edge slots 384, discussed below.

In a radial orientation, the airfoil side walls 312, 314 extend from a base 324 at the platform 350 to a blade tip 320. In general, the blade tip 320 is positioned to rotate in close proximity to the shroud 210 (FIG. 2) in order to maximize energy extraction. In one embodiment, the tip 320 may be formed by a tip cap 330 that is recessed slightly relative to tip extensions 332, 334 on each side wall 312, 314. One or both of the tip extensions 332, 334 may define tip slots 336 to cool the tip 320 and/or to mitigate tip leakage between the tip 320 and shroud. The tip slots 336 may be considered to extend from an internal cooling circuit, through the tip cap 330, and through the respective tip extension 332, 334. As described below, the tip slots 336 may also facilitate dust removal.

In some embodiments, the tip extensions 332, 334 are curved or otherwise inclined in a forward direction relative to a radial axis (or plane) that otherwise extends through the respective side wall 312, 314. For example, the tip extensions 332, 334 may be inclined approximately 15-60°, although any suitable angle (or no angle) may be provided. A row of tip slots 336 extend along the chord-length of one or both tip extensions 332, 334. As an example, each tip slot 336 may have a diameter in a range of about 0.20 mm to about 0.70 mm, as an example, and other diameters may be provided. In the one exemplary embodiment, each tip slot 336 has an outlet on a radial wall of the tip extension 332, 334, while in other embodiments, the outlet may be positioned on the forward or aft walls.

In one exemplary embodiment, each tip slot 336 converges along the length between an inlet and an outlet in one or more dimensions. In particular, each tip slot 336 has a cross-sectional area that decreases along the length. In one exemplary embodiment, the cross-sectional area continuously decreases along the length. The converging nature of the tip slots 336 results in an increased flow velocity while preventing or mitigating pressure losses at the hole inlet, thereby maximizing the pressure of the air flow through the outlet. The inlet to exit area ratio can typically vary between 1.5 to 2, although other area ratios may be provided.

Generally, as used herein, the terms "slot," "hole," "passage," "channel," and "nozzle" may be used interchangeably and include any type of fluid communication structure for conveying fluid between internal channels or passages and/or from an internal channel to outside the blade, including structures with round, oval, rectangular, square, irregular, or other cross-sectional shapes.

As noted above, the rotor blade 260, particularly the airfoil 310, is subject to extremely high temperatures resulting from high velocity hot gases ducted from the combustion section 140 (FIG. 2). If unaddressed, the extreme heat may impact the useful life of an airfoil and/or impact the maximum operating temperature of the engine. As such, cooling is provided for the airfoil 310 to maintain blade temperature at an acceptable level. Such cooling may include an internal cooling system that directs cooling air from the compressor section 130 into inlets in the root 360 and through internal cavities and channels to cool the airfoil 310 via convection and conduction. The air flowing through the internal cooling system may flow out of the airfoil 310 through the trailing edge slots 384 to provide temperature control of the trailing edge 318 and through tip slots 336 at the tip 320. Additionally, the cooling air flowing through the internal cooling system may also be supplied to film cooling holes (not shown) arranged to provide a cooling film of fluid onto the surface of the airfoil 310. Such film cooling holes may be provided in various locations, such as in the area of the leading edge 316 or at any chordwise location along the pressure side wall 312 and/or suction side wall 314.

In some environments, air entering the engine may contain dust or particles (generally, "dust") such that the cooling air from the compressor may also contain dust. As described below, the airfoil 310 may particularly be configured to accommodate the dust resulting from operation within dusty or dirty environments, for example, by preventing or mitigating the accumulation and possible blocking of portions of the internal cooling system, which unless otherwise addressed may adversely impact the cooling efficiency. Although applicable to dust of any size, exemplary embodiments may be beneficial with respect to dust having particle sizes up to 20 microns.

Figure 4:
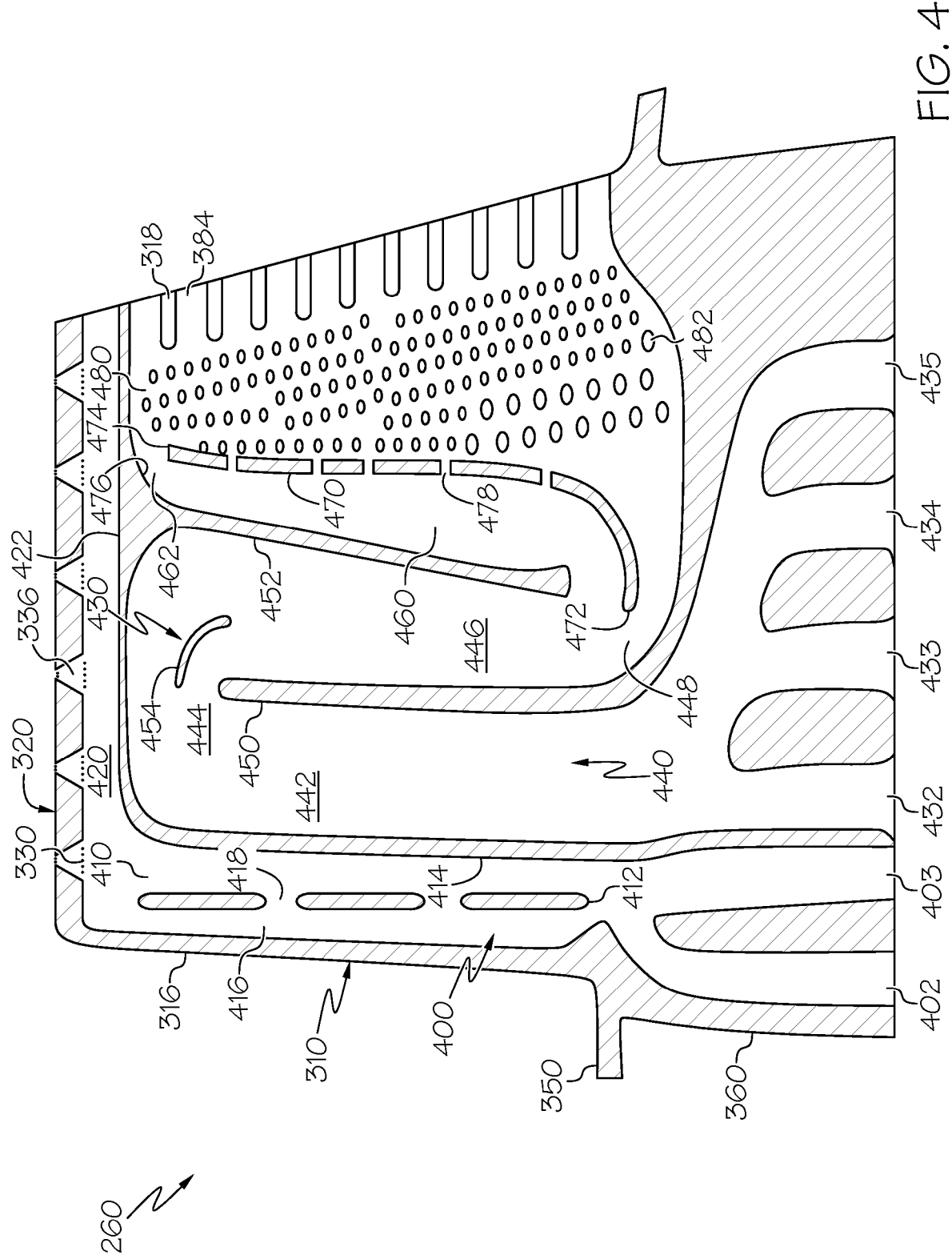
FIG. 4 is a cross-sectional view of the turbine rotor blade of FIG. 3 in accordance with an exemplary embodiment.

FIG. 4 is a partial cross-sectional view of the rotor blade 260 of FIG. 3 in accordance with an exemplary embodiment. As shown, the cross-sectional view may generally correspond to a cross-sectional view through a radial-chordwise plane. In the discussion below, the term "chordwise" refers to a generally longitudinal dimension along the airfoil between leading edge and trailing edge, typically curved for air flow characteristics. As noted above, the term "radial" refers to directions generally perpendicular to the engine centerline, which in the view of FIG. 4 refers to the dimension between root 360 and tip 320, perpendicular to the chordwise dimension. The term "tangential" refers to the dimension that is perpendicular to the chordwise and radial dimensions, e.g., into or out of the page of FIG. 4. Directions within these dimensions may also be referenced below. For example, the term "radial outward direction" refers to a direction along the radial dimension toward the blade tip 320, and the term "radial inward direction" refers to a direction along the radial dimension toward the root 360. As another example, the term "chordwise forward direction" refers to a direction along the chordwise dimension toward the leading edge 316, and the term "chordwise aft direction" refers to a direction along the chordwise dimension toward the trailing edge 318.

As discussed above with reference to FIG. 3, the rotor blade 260 of FIG. 4 includes the platform 350 and the airfoil 310 with leading edge 316, trailing edge 318, tip slots 336, trailing edge slots 384, and blade tip 320. FIG. 4 additionally shows the interior structure of the rotor blade 260 that includes an internal cooling system formed by two cooling circuits 400, 430, although any number of cooling circuits may be provided. The cooling circuits 400, 430 direct cooling air from passages 402, 403, 432-435 in the root 360 and/or rotor discs (not shown) to cool designated portions of the airfoil 310. In this embodiment, cooling circuit 400 receives cooling air from source passages 402, 403, and cooling circuit 430 receives cooling air from source passages 432-435. Such cooling air may be obtained as bleed flow from the compressor section 130 (FIG. 1). As described below, the cooling circuits 400, 430 are formed by the side walls 312, 314 and internal structures that direct the air flow through the airfoil 310. Generally, the first cooling circuit 400 may be considered a leading edge cooling circuit; and the second cooling circuit 430 may be considered a central cooling circuit, a trailing edge cooling circuit, or a combination of a central cooling circuit and a trailing edge cooling circuit.

The first cooling circuit 400 includes a first passage (or chamber or channel) 410 extending with a generally radial orientation, as shown in FIG. 4. The first passage 410 is partially formed by internal walls 412, 414, although other embodiments may have alternate configurations. The forward or leading internal wall 412 forms a leading edge passage (or chamber or channel) 416 with the interior surfaces of the side walls 312, 314 (FIG. 3) at the leading edge 316. As shown, the leading edge passage 416 extends in a radial dimension along the length of the leading edge 316. The leading internal wall 412 has a number of holes (or nozzles) 418 such that the first passage 410 and the leading edge passage 416 are in fluid communication. The first passage 410 and leading edge passage 416 may be at least partially bounded in the radial outward direction by tip cap 330.

In this example, the first passage 410 and/or leading edge passage 416 transition into a tip cap (or tip flag) passage 420. The tip cap passage 420 extends in a generally chordwise aft direction from the radial ends the first passage 410 and/or leading edge passage 416 to the trailing edge 318. In one embodiment, the tip cap passage 420 is at least partially formed in the radial orientation by the tip cap 330 and an internal chordwise wall 422. The tip cap passage 420 is fluidly coupled to the tip slots 336 and the trailing edge slots 384.

Accordingly, during operation, a first portion of cooling air flows through the first passage 410, through the holes 418 in the internal wall 412, and through the leading edge passage 416 to cool the leading edge 316. In one exemplary embodiment, at least a portion of air flows from the first passage 410 to the leading edge passage 416 such that the cooling air impinges upon the leading edge 316. After striking the internal surface of the leading edge 316, the air, which may now be considered spent air, may exit the leading edge passage 416 through holes (not shown) in the side walls out of the airfoil 310, through tip slots 336 in the blade tip 320 out of the airfoil 310, into the tip cap passage 420 within the airfoil 310, or through another exit location. Any remaining air at the radial end of the first passage 410 may exit the first passage 410 through holes (not shown) in the side walls out of the airfoil 310, through tip slots 336 in the blade tip 320 out of the airfoil 310, into the tip cap passage 420 within the airfoil 310, or through another exit location. Generally, however, spent air flowing through the leading edge passage 416 and/or air flowing through the first passage 410 is directed from a radial outward direction into a chordwise aft direction through the tip cap passage 420. As noted above, air flowing through the tip cap passage 420 may flow out of the tip cap passage 420 through holes (not shown) in the side walls out of the airfoil 310, through tip slots 336 in the blade tip 320 out of the airfoil 310, and/or through the trailing edge slots 384 out of the airfoil 310.

In this example, the second cooling circuit 430 includes a serpentine passage 440, an acceleration channel 460, and a trailing edge chamber 480 extending through the airfoil 310, although other embodiments may have alternate configurations. In particular, serpentine passage 440 includes a first leg 442 extending from one or more of the source passages 432-435, initially in a generally radial outward direction, and transitioning at transition 444 into a second leg 446, which extends in a radial inward direction. The second leg 446 transitions at transition 448 into the acceleration channel 460 and/or the trailing edge chamber 480, discussed below. The first leg 442 is at least partially formed by internal wall 414 and internal wall 450. The second leg 446 is at least partially formed by internal wall 450 and internal wall 452.

As shown, the first and second legs 442, 446 and transition 444 function to redirect the air flow through a path of approximately 180°, e.g., from a radial outward direction to a radial inward direction. The transition 444 between the legs 442, 446 is formed by the chordwise wall 422 and is shaped to perform this function. In this embodiment, the transition 444 includes an internal turning vane 454 within the flow path that facilitates air flow redirection from a chordwise aft direction to a radial inward direction, e.g., from the transition 444 into the second leg 446.

The acceleration channel 460 extends in a generally radial outward direction from the transition 448 of the serpentine passage 440 to a radial end 462, which is fluidly coupled to the trailing edge chamber 480. The acceleration channel 460 is defined by the internal wall 452 and the internal wall 470 such that, with respect to the acceleration channel 460, internal wall 452 is considered a forward radial internal wall and internal wall 470 is considered an aft radial internal wall. In this example, the aft radial internal wall 470 includes a first end 472 that extends, relative to air flow, from a chordwise orientation to a radial orientation and terminates at a second end 474. The first end 472 facilitates directing a portion of the air from the serpentine passage 440 into the acceleration channel 460 and further operates to separate the acceleration channel 460 from the trailing edge chamber 480. The second end 474 forms a portion of the flow path or slot interface between the acceleration channel 460 and the trailing edge chamber 480 to fluidly couple the downstream end of the acceleration channel 460 to the trailing edge chamber 480. The aft radial internal wall 470 further includes a series or array of crossover passages 478 that additionally fluidly couple the acceleration channel 460 to the trailing edge chamber 480 along a portion of the length of the aft radial internal wall 470. Generally, the crossover holes 478 may have various shapes and sizes to provide desired flow characteristics through the acceleration channel 460, as described in greater detail below.

In this embodiment, the acceleration channel 460 is defined in the radial outward direction by a portion of the chordwise wall 422. In particular, the chordwise wall 422 includes a curved surface 476 transitioning from the forward radial internal wall 452 that facilitates redirecting the air flowing through the acceleration channel 460 from a radial outward direction into a generally chordwise aft direction into the trailing edge chamber 480. Additional details about the acceleration channel 460 are provided below.

The trailing edge chamber 480 extends in the chordwise aft direction from the internal wall 470 to the trailing edge 318 and in the radial outward direction from the root 360 or platform 350 to the underside of the chordwise wall 422. An array of pins 482 may be arranged in the chamber 480 that extend completely or partially with a tangential orientation between airfoil side walls. In one embodiment, the pins 482 are circular, although the pins 482 may vary in shape, size, arrangement, and characteristics.

Accordingly, during operation, a portion of cooling air flows through the source passages 432-435, through the first leg 442, through transition 444, through the second leg 446, through transition 448, and into the acceleration channel 460 or the trailing edge chamber 480. The acceleration channel 460 directs the cooling air in a generally radial outward direction until transitioning along the curved surface 476 of the chordwise wall 422 into the trailing edge chamber 480 in the chordwise aft direction. Along the length of the acceleration channel 460, a portion of the cooling air may pass through crossover passages 478 into the trailing edge chamber 480 upstream of the downstream end 462. From the trailing edge chamber 480, the cooling air flows out of the trailing edge slots 384 or through cooling holes (not shown) in the side walls 312, 314. Other configurations may be provided, some of which are discussed below.

As introduced above, the blade 260 may include one or more characteristics that operate to make the airfoil 310 more tolerant to dusty or dirty environments. In particular, the cooling circuits 400, 430 may operate to prevent and/or mitigate dust from being deposited onto internal surfaces of the airfoil 310, and thus, failing to exit the blade 260. Unless otherwise addressed, internal deposition may lead to blocked holes or passages and/or reduce cooling effectiveness. Instead, the characteristics discussed below facilitate the acceleration of cooling air through the airfoil 310 such that dust is directed out of the blade 260, while maintaining the cooling function of the air flow. The features that provide an acceleration of air flow may prevent or mitigate dust deposition not only in the region of the respective feature, but the resulting higher velocity flow of air may also prevent or mitigate dust deposition in the regions downstream of such features.

In one embodiment, dust tolerance is enabled by the characteristics of the acceleration channel 460. Particularly, at least a portion of the acceleration channel 460 converges or decreases in cross-sectional area (e.g., the cross-sectional area normal to flow) such that air flowing in a downstream flow direction is accelerated. In one embodiment, portions of the acceleration channel 460 narrow in a chordwise orientation and in a tangential orientation along the downstream direction. For example, in some arrangements, the cross-sectional area of the acceleration channel 460 in a generally upstream radial position (e.g., near end 472) may be greater than the cross-selection area in a radial position approximately halfway along the channel 460, which in turn may be greater than the cross-sectional area in a generally downstream position (e.g., near radial end 462). In other arrangements, only particular portions or sections of the acceleration channel 460 are structured with converging cross-sectional areas. As described below, the converging nature of the acceleration channel 460 is particularly advantageous at the downstream portion or section of the acceleration channel 460, such as proximate to the downstream end 462. In one particular embodiment, the acceleration channel 460 may be considered to be converging in cross-sectional area from the last crossover passage 478 (e.g., the most radial outward crossover passage) in the downstream direction to the end 462 of the acceleration channel 460 at the trailing edge chamber 480. This acceleration of flow in the downstream direction provides a velocity such that any dust within the air flow is less likely to adhere to a surface within the acceleration channel 460 or downstream of the acceleration channel 460. In particular, the velocity is such that dust adherence is prevented or mitigated when the flow transitions from the radial orientation to a chordwise orientation along the curved surface 476 of the chordwise wall 422. The higher velocity flow of air also provides momentum to the dust along the chordwise wall 422 within the trailing edge chamber 480 such that the dust is more likely to be expelled from the trailing edge slots 384.

Additionally, the curved surface 476 of the chordwise wall 422 at the end 462 of the acceleration channel 460 may be configured or shaped to further prevent or mitigate dust adherence to the surface 476. In particular, the curved surface 476 may have a constant or increasing radius of curvature in a downstream direction of air flow. This enables the cooling flow transitioning from the acceleration channel 460 to increase or maintain velocity as the cooling flow is redirected in a generally chordwise aft direction into the trailing edge chamber 480.

In a further embodiment, the chordwise wall 422 that bounds the trailing edge chamber 480 may additionally include characteristics that prevent or mitigate dust adherence to the underside of the chordwise wall 422 as air flows through the trailing edge chamber 480 toward the trailing edge slots 384. In particular, the orientation of the chordwise wall 422 is at least partially angled relative to the chordwise orientation in a radial outward direction. In other words, the radial height (i.e., the radial distance from engine centerline) to the underside of the chordwise wall 422 in the trailing edge chamber 480 increases in a downstream direction. In one example, the radial height is continually increasing in the flow direction towards the trailing edge 318. This enables the flow of cooling air to maintain at least some aspect of radial outward velocity as the air flows in the chordwise aft direction, thereby reducing the likelihood of dust adhering to the chordwise wall 422. Additional features that provide beneficial flow characteristics are discussed below.

Although discussed above with reference to an embodiment with a serpentine passage, the acceleration channel 460 of FIG. 4 may be incorporated into other types of blades and cooling schemes. For example, characteristics of the acceleration channel 460 discussed above may be implemented as any type of generally radial passage or channel, particularly one that transitions radial air flow in chordwise orientation into a trailing edge chamber or pin bank, including radial through-flow blades. Further examples are discussed below.

Figure 5:
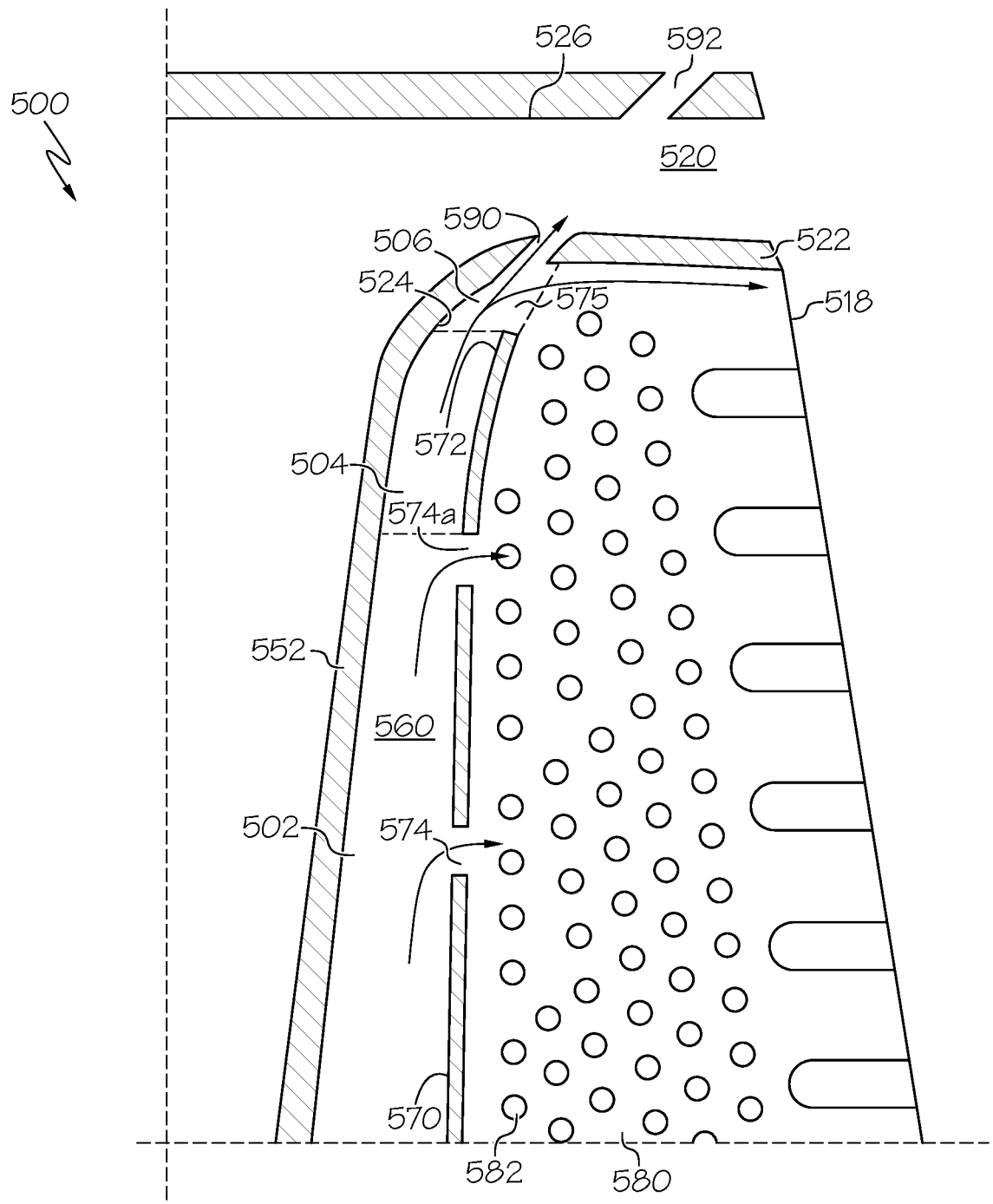
FIG. 5 is a partial cross-sectional view of a turbine rotor blade in accordance with another exemplary embodiment.

FIG. 5 is a partial cross-sectional view of a rotor blade 500, which unless otherwise noted is similar to the rotor blade 260 of FIGS. 3 and 4. With respect to FIG. 4, the view of FIG. 5 generally depicts a downstream portion of an acceleration channel 560 that accelerates cooling air into a trailing edge chamber 580 with an array of pins 582. As above, the acceleration channel 560 may be formed by a forward radial internal wall 552 that extends between the acceleration channel 560 and more forward passages and chambers in the rotor blade 500 and an aft radial internal wall 570 that extends between the acceleration channel 560 and the trailing edge chamber 580. The aft radial internal wall 570 terminates at an end 572 to create a flow slot 575 that enables air to flow into the trailing edge chamber 580. The flow slot 575 may have any suitable configuration for flow characteristics, stability, or durability and function as the final flow path between the acceleration channel 560 and the trailing edge chamber 580. Generally, the acceleration channel 560 may be considered to include an inlet section (not shown in FIG. 5), a main section 502, a radial end section 504, and a transition section 506. The arrangement of the sections 502, 504, 506 is generally depicted with dashed lines in FIG. 5.

As described above, the internal wall 570 may include one or more crossover passages 574 that may additionally enable a portion of air to flow from the acceleration channel 560 to the trailing edge chamber 580 along the length of the acceleration channel 560 upstream of the flow slot 575. The crossover passages 574 may be arranged in any suitable pattern or configuration. Generally, however, each of the crossover passages 574 may be considered to have a radial height along the aft radial internal wall 570 such that, in the downstream direction, the crossover passages 574 may be considered to include a last crossover passage (labeled 574a) with the greatest radial height relative to the other crossover passages 574. In other words, the surface of the aft radial internal wall 570 beyond the last crossover passage 574a is unbroken or uninterrupted until the termination of the acceleration channel 560. In one embodiment, the main section 502 of the acceleration channel 560 may be considered to extend to the outer radial edge of the last crossover passage 574a.

The radial end portion 504 of the acceleration channel 560 may be considered to extend from the last crossover passage 574a to the end 572 of the aft radial internal wall 570. As such, the radial end section 504 is partially formed by an unbroken segment or area (e.g., no holes or passages) of the aft radial internal wall 570.

In this embodiment, the acceleration channel 560 is bounded in the radial direction by a portion of the chordwise wall 522 that extends from the forward radial internal wall 552 at a transition surface 524. In particular, the transition surface 524 includes a curved interior surface that facilitates redirecting the air flowing through the acceleration channel 560 from a radial outward direction into a generally chordwise aft direction into the trailing edge chamber 580. The transition section 506 is considered to include the portion of the acceleration channel 560 along the curved of the transition surface 524 to a position proximate to the end 572 of the aft radial internal wall 570, which generally corresponds to the position at which the curved transition surface 524 continues in the chordwise orientation as the chordwise wall 522. The transition section 506 may further be considered to include the flow slot 575.

As also partially depicted in FIG. 5, the rotor blade 500 includes a tip cap (or tip flag) passage 520 extending with a generally chordwise orientation to a trailing edge 518. In the radial orientation, the tip cap passage 520 is at least partially formed by the internal chordwise wall 522 and a tip cap 526 at the blade tip.

As above, characteristics of the acceleration channel 560 and other aspects of the rotor blade 500 may improve dust tolerance. For example, at least a portion of the acceleration channel 560 converges or decreases in cross-sectional area (e.g., the cross-sectional area normal to flow) such that air flowing in a downstream direction is accelerated. In one embodiment, the acceleration channel 560 narrows in a chordwise orientation and in a tangential orientation in these converging portions. In one embodiment, the entire radial end section 504 of the acceleration channel 560 continually converges in the downstream direction. In a further embodiment, the entire transition section 506 continually converges in the downstream direction. In some embodiments, the entire radial end section 504 and the entire transition section 506 continually converge in the downstream direction. In other words, the portions of the acceleration channel 560 from the trailing edge of the last downstream crossover passage 574*a* continually narrow to the termination of the acceleration channel 560 at the trailing edge chamber 580. As a result of this arrangement, dust laden flow may exit the flow slot 575 and be expunged from the outer portion of the trailing edge chamber 580 out the trailing edge 518. In some instances, the outer or last 20% of the acceleration channel 560 may continually converge in the downstream direction. In further embodiments, the entire acceleration channel 560 continually converges in the downstream direction.

Additionally, in this example, the transition 524 includes a crossover hole 590 that fluidly couples the acceleration channel 560 to a radial outward passage, which in this example, is the tip cap passage 520. The crossover hole 590 may be angled and positioned at a tangent to the curvature of the air flow within the transition 524 at the respective position. The hole 590 may be straight or curved and may originate in the acceleration channel 560, transition 524, and/or the trailing edge chamber 580. Although one hole 590 is depicted, multiple holes may be provided.

Generally, the hole 590 functions to expel dust from the acceleration channel 560 into the tip cap passage 520 such that the dust is swept out of the passage 520, e.g., via end slots on the trailing edge 518. In some instances, the crossover hole 590 may prevent or mitigate the likelihood that dust flowing along the transition 524 is deposited or stagnates at the transition 524 or on the chordwise wall 522.

In this embodiment, the blade tip of the rotor blade 500 may further include an exit hole 592 in the tip cap 502 that is aligned with the crossover hole 590. This configuration enables dust from the acceleration channel 560 to be directed through the crossover hole 590 and through the exit hole 592 in a generally straight line and further provide tip cooling in that region. The thickness of the chordwise wall 522 may be sized to create a desirable exit flow angle of the air passing between the two passages 560, 520. In some examples, the aligned tip exit hole 592 may prevent or mitigate dust flowing through the hole 590 from impinging and adhering to the underside of the tip cap 526.

Figure 6:
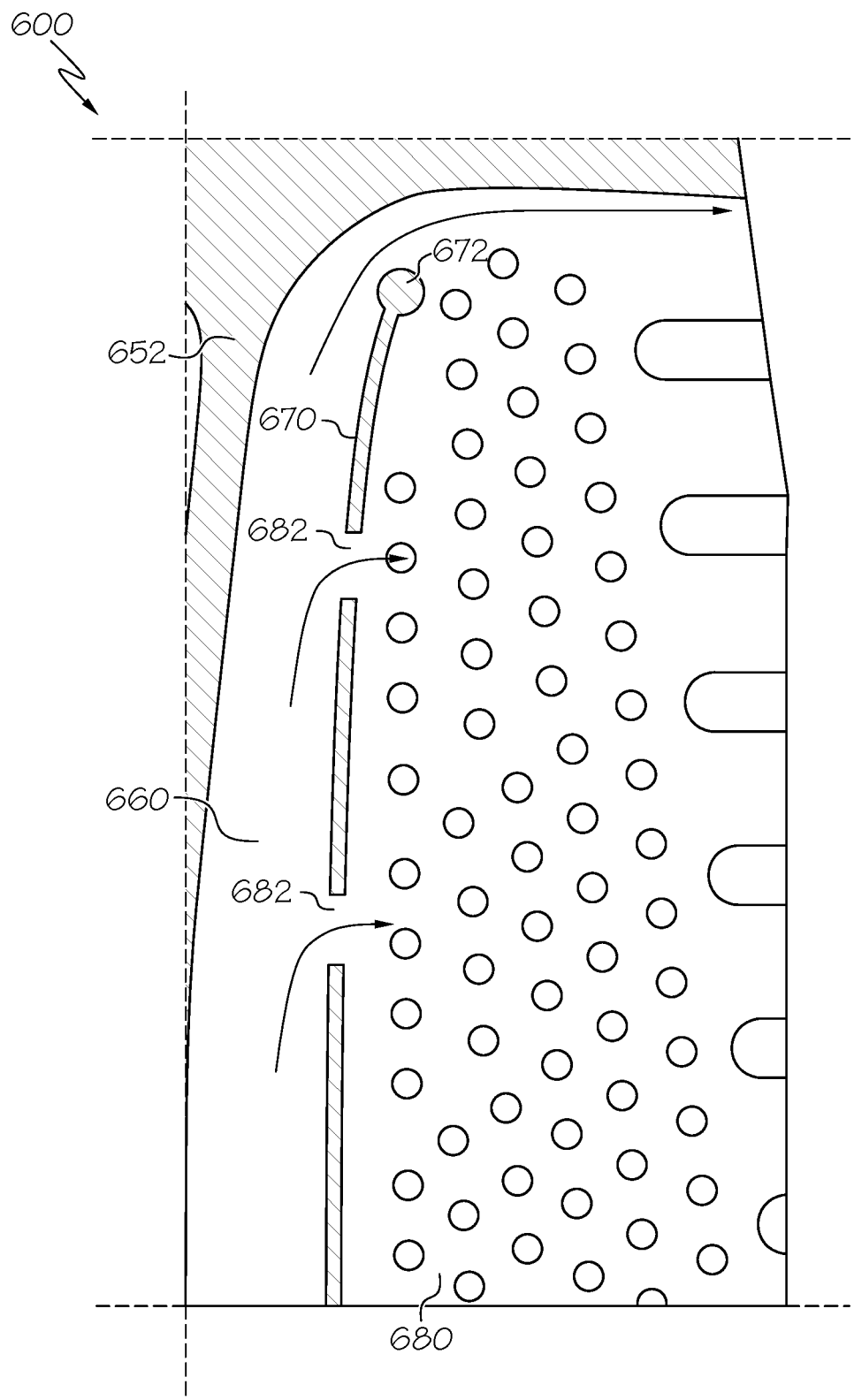
FIG. 6 is a partial cross-sectional view of a turbine rotor blade in accordance with a further exemplary embodiment.

FIG. 6 is a partial cross-sectional view of a rotor blade 600, which unless otherwise noted is similar to the rotor blade 260 of FIGS. 3 and 4. With respect to FIG. 4, the view of FIG. 6 generally depicts a downstream portion of an acceleration channel 660 that directs cooling air into a trailing edge chamber 680. As above, the acceleration channel 660 may be formed by a forward radial internal wall 652 that extends between the acceleration channel 660 and more forward passages and chambers in the rotor blade 600 and an aft radial internal wall 670 that extends between the acceleration channel 660 and the trailing edge chamber 680.

The aft radial internal wall 670 terminates at an end 672 to enable air to flow into the trailing edge chamber 580. The internal wall 670 may include one or more crossover passages 682 that may additionally enable air to flow from the acceleration channel 660 to the trailing edge chamber 680.

In this embodiment, the end 672 of the aft radial internal wall 670 is formed by a bulb, protrusion, and/or other form of shaped or enlarged structure. The enlarged end 672 may function to further accelerate the air exiting the acceleration channel 660 and provide optimal directionality, thereby preventing or mitigating deposition of dust within the air on an internal surface.

Figure 7:
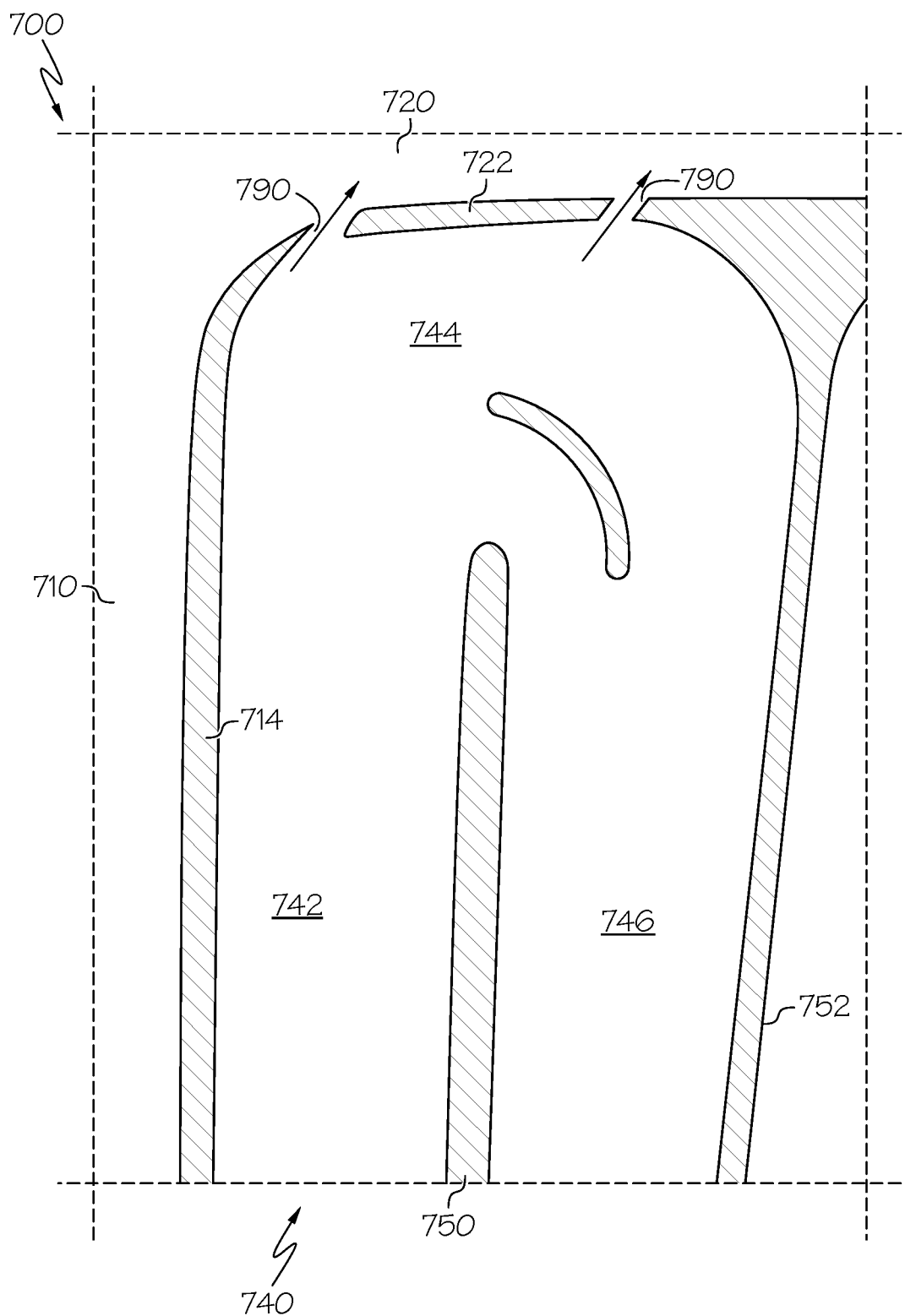
FIG. 7 is a partial cross-sectional view of a turbine rotor blade in accordance with a further exemplary embodiment.

FIG. 7 is a partial cross-sectional view of a rotor blade 700, which unless otherwise noted is similar to the rotor blade 260 of FIGS. 3 and 4. With respect to FIG. 4, the view of FIG. 7 generally depicts a portion of a serpentine passage 740 with a first leg 742 (partially shown) that transitions at transition 744 into a second leg 746 (partially shown). As above, the passage 740 is formed by radial internal walls 714, 750, 752 and a chordwise wall 722 extending between the internal walls 714, 752 at the transition 744.

The rotor blade 700 includes a tip cap (or tip flag) passage 720 extending in a generally aft chordwise direction from a forward passage 710 (partially shown) to the trailing edge (not shown). As shown, the tip cap passage 720 is at least partially formed in the radial orientation by the internal chordwise wall 722.

In this embodiment, the internal chordwise wall 722, particularly at the transition 744, includes one or more crossover holes 790 that fluidly couple the passage 740 to the tip cap passage 720. The crossover holes 790 may be straight, multi-angled, or curved to expel dust from the transition 744 in a manner such that the dust does not impinge on or adhere to the upper wall of the tip cap passage 720 (e.g., the underside of the tip cap). In one example, the holes 790 are oriented such that the air and dust flowing therethrough include a significant velocity component in the direction of the average velocity vector within the tip cap passage 720 (e.g., typically in a generally chordwise aft direction), thereby preventing or mitigating dust deposition on internal blade surfaces. As in the embodiment of FIG. 6, the tip cap may include one or more holes (not shown) aligned with the crossover holes 790 to expel the dust exiting the passage 720 out of the blade 700 and/or the dust may be expelled through trailing edge slots.

Accordingly, the rotor blades described above operate to mitigate or prevent dust deposition within the internal cooling circuits by accelerating the flow of air through one more of the chambers, passages, or channels. For example, acceleration may be provided to prevent dust accumulation in regions of the cooling circuits in which air flow would otherwise stagnate, such as surfaces that receive impingement cooling, hole edges, and surfaces of constant radius with radial body forces. In particular, the stagnation areas may correspond to areas in which the flow changes direction, for example around corners or when the flow velocity in one direction slows down (e.g., as a result of radial friction) and the flow velocity in another direction speeds up (e.g., in the axial direction) or vice versa. In other words, the term "stagnation" may refer to a flow region where the direction of flow changes, e.g., flow velocity comes to the rest or slows down in one direction, changes direction, and picks up velocity in another direction. As such, these areas of flow direction changes with slowing velocity may be identified as stagnation areas and addressed to provide acceleration of flow. A number of embodiments are discussed above. It should be noted that the various embodiments of FIGS. 4-7 may be used in combination with one another.

Generally, the configuration of the cooling circuits may be derived using multiphase CFD in which dust particles are modeled in the blade coolant flow. For example, areas in which dust is deposited during testing may be identified and addressed, as described above. Exemplary embodiments discussed above may be fabricated using standard casting or additive manufacturing techniques. The exemplary embodiments discussed above are particularly beneficial in operating locations with significant amounts of airborne particulates.

Although airfoils with dust removal characteristics are described above with respect to a turbine blade, such characteristics may also be incorporated into stator airfoils. The internal cooling circuits described above are exemplary configuration and generally correspond to a high effectiveness cooled turbine blade or vane. Other types and configurations of cooling circuits may be provided, including more integrated or isolated cooling circuits, to optimize flow and heat transfer characteristics of the respective flow circuit. Various pins, crossover holes, turning vanes, turbulators, depressions, and accelerators may be provided in the internal cooling circuits as necessary or desired. Further, although the cooling circuits may be described above as separate circuits, the various cooling circuits may be integrated with one another or otherwise be in flow communication.

Exemplary embodiments of the turbine airfoil discussed above have resulted in an ability to increase engine temperature, thereby improving fuel consumption and power density. Exemplary embodiments promote the service life and/or enhanced performance in a cost-effective manner. Each of the exemplary embodiments discussed above may be used in combination with one another. The turbine airfoils produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An airfoil for a gas turbine engine, comprising:
   a first side wall;
   a second side wall joined to the first side wall at a leading edge and a trailing edge, the first and second side walls extending in a radial outward direction from a base coupled to an airfoil platform; and
   an internal cooling system arranged within the first and second side walls configured to direct cooling air through and out of the airfoil, the internal cooling system including a first cooling circuit comprising:
      an acceleration channel generally extending in a radial outward direction and receiving cooling air from a first source, wherein at least a first section of the acceleration channel decreases in cross-sectional area along the radial outward direction such that the cooling air is accelerated through the first section of the acceleration channel, the acceleration channel defined in a radial outward direction by a forward radial internal wall that extends radially from a chordwise wall, with a portion of the chordwise wall having a curved surface to transition from the forward radial internal wall to a trailing edge chamber; the trailing edge chamber fluidly coupled to receive at least a portion of the cooling air from the acceleration channel and extending generally in a chordwise aft direction from the acceleration channel to the trailing edge; and
      an aft radial internal wall extending between the acceleration channel and the trailing edge chamber, the aft radial internal wall cooperating with the forward radial internal wall to define the acceleration channel, the aft radial internal wall defining crossover passages that fluidly couple the acceleration channel to the trailing edge chamber, the aft radial internal wall extending from a chordwise orientation at a first end to a radial orientation at a second end, the first end spaced apart from an end of the forward radial internal wall to define an inlet for the acceleration channel and the second end spaced apart from the chordwise wall to form a slot interface between the acceleration channel and the trailing edge chamber.

2. The airfoil of claim 1, wherein the first section of the acceleration channel continually decreases in the cross-sectional area along the radial outward direction such that the cooling air is continually accelerated through the first section of the acceleration channel.

3. The airfoil of claim 2, wherein the first section of the acceleration channel extends from a last downstream crossover passage of the crossover passages to a downstream end of the acceleration channel.

4. The airfoil of claim 1, wherein the curved surface has a constant radius of curvature or increasing radius of curvature.

5. The airfoil of claim 4, wherein the trailing edge chamber is at least partially defined by a second portion of the chordwise wall that extends from the curved surface to the trailing edge of the airfoil.

6. The airfoil of claim 5, wherein the chordwise wall has a radial height that increases along the chordwise aft direction.

7. The airfoil of claim 1, wherein the internal radial wall has an enlarged radial end at a transition between the acceleration channel and the trailing edge chamber.

8. The airfoil of claim 7, wherein the enlarged radial end is bulb-shaped.

9. The airfoil of claim 1, wherein the acceleration channel is at least partially defined at a radial end by the curved surface of the portion of the chordwise wall, wherein a second portion of the chordwise wall that extends from the curved surface to the trailing edge of the airfoil includes at least a first crossover hole angled in the chordwise aft direction, the first crossover hole defined between the curved surface and the trailing edge of the airfoil.

10. The airfoil of claim 9,
    further comprising a tip cap extending between the first and second side walls such that the tip cap and at least portions of the first and second side walls form a blade tip,
    wherein the internal cooling system further includes a tip cap passage extending between the tip cap and the chordwise wall in the chordwise aft direction to the trailing edge, and wherein the first crossover hole fluidly couples the acceleration channel to the tip cap passage.

11. The airfoil of claim 10, wherein the tip cap defines an exit hole aligned with the first crossover hole and angled in the chordwise aft direction, and configured to direct the cooling fluid through the first crossover hole and the exit hole in a generally straight line.

12. The airfoil of claim 1, wherein the first cooling circuit includes a serpentine passage fluidly coupled to the acceleration channel as the first source, wherein the serpentine passage includes at least a first leg configured to direct the cooling air in the radial outward direction, a second leg configured to direct the cooling air in a radial inward direction, and a transition extending between the first and second legs.

13. The airfoil of claim 12, wherein the transition is formed by an internal chordwise wall that includes at least one crossover hole.

14. An airfoil for a gas turbine engine, comprising:
a first side wall;
a second side wall joined to the first side wall at a leading edge and a trailing edge, the first and second side walls extending in a radial outward direction from a base coupled to an airfoil platform;
a tip cap extending between the first and second side walls such that the tip cap and at least portions of the first and second side walls form a blade tip; and
an internal cooling system arranged within the first and second side walls configured to direct cooling air through and out of the airfoil, the internal cooling system including:
a first cooling circuit comprising at least:
a leading edge cooling passage extending from a first source in the radial outward direction, and
a tip cap passage fluidly coupled to the leading edge cooling passage and extending in a chordwise aft direction between the leading edge cooling passage and the trailing edge, wherein the tip cap passage is at least partially formed by tip cap and a chordwise wall; and
a second cooling circuit comprising at least:
a serpentine passage including a first leg extending from a second source in the radial outward direction, a second leg extending in a radial inward direction, and a first transition fluidly coupling the first leg to the second leg, wherein the first transition is at least partially formed by the chordwise wall, and wherein the chordwise wall includes at least a first crossover hole at the first transition that fluidly couples the serpentine passage to the tip cap passage,
an acceleration channel fluidly coupled to the serpentine passage and generally extending in the radial outward direction, the acceleration channel defined by a forward radial internal wall that extends radially from the chordwise wall and an aft radial internal wall extending between the acceleration channel and a trailing edge chamber, the acceleration channel at least partially defined at a radial end by a second transition at least partially formed by the chordwise wall, and the chordwise wall includes at least a second crossover hole at the second transition that is angled in the chordwise aft direction to fluidly couple the acceleration channel to the tip cap passage and defines a slot that fluidly couples the acceleration channel to the trailing edge chamber, and
the trailing edge chamber fluidly coupled to the acceleration channel and extending generally in the chordwise aft direction from the acceleration channel to the trailing edge,
wherein the tip cap defines an exit hole aligned with the second crossover hole and angled in the chordwise aft direction configured to direct the cooling fluid through the second crossover hole and the exit hole in a generally straight line.

15. The airfoil of claim 14, wherein at least a first section of the acceleration channel continually decreases in cross-sectional area along the radial outward direction such that the cooling air is continually accelerated through the first section of the acceleration channel.

16. The airfoil of claim 14, wherein the second transition is formed with a curved surface having a constant radius of curvature or increasing radius of curvature, and the second crossover hole is defined between the curved surface and the trailing edge of the airfoil.

17. The airfoil of claim 16, wherein the trailing edge chamber is at least partially defined by the chordwise wall, and wherein the chordwise wall has a radial height that increases along the chordwise aft direction.

18. The airfoil of claim 14, wherein the aft radial internal wall has a bulb-shaped radial end.

19. The airfoil of claim 14, wherein the aft radial internal wall defines crossover passages that fluidly couple the acceleration channel to the trailing edge chamber, the aft radial internal wall extending from a chordwise orientation at a first end to a radial orientation at a second end, the first end spaced apart from an end of the forward radial internal wall to define an inlet for the acceleration channel and the second end spaced apart from the chordwise wall to form the slot between the acceleration channel and the trailing edge chamber.

* * * * *